United States Patent
Nguyen et al.

(10) Patent No.: US 10,459,508 B2
(45) Date of Patent: Oct. 29, 2019

(54) LOW FREQUENCY POWER MANAGEMENT BUS

(71) Applicant: KONICA MINOLTA LABORATORY U.S.A., INC., San Mateo, CA (US)

(72) Inventors: Thien Nguyen, San Mateo, CA (US); Sarma Sista, Menlo Park, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 118 days.

(21) Appl. No.: 15/610,503

(22) Filed: May 31, 2017

(65) Prior Publication Data

US 2018/0348837 A1 Dec. 6, 2018

(51) Int. Cl.
| | |
|---|---|
| *G06F 1/32* | (2019.01) |
| *G06F 1/324* | (2019.01) |
| *G06F 13/42* | (2006.01) |
| *G06F 1/3287* | (2019.01) |
| *G06F 1/3234* | (2019.01) |
| *G06F 13/38* | (2006.01) |
| *G06F 1/3296* | (2019.01) |
| *G06F 1/3203* | (2019.01) |

(52) U.S. Cl.
CPC ............ *G06F 1/324* (2013.01); *G06F 1/3253* (2013.01); *G06F 1/3287* (2013.01); *G06F 1/3296* (2013.01); *G06F 13/385* (2013.01); *G06F 13/4282* (2013.01); *G06F 1/3203* (2013.01); *G06F 2213/0026* (2013.01)

(58) Field of Classification Search
CPC ...... G06F 1/324; G06F 1/3253; G06F 1/3287; G06F 1/3296; G06F 13/4282; G06F 2213/26
USPC ....................................................... 713/322
See application file for complete search history.

(56) References Cited

U.S. PATENT DOCUMENTS

| | | | | |
|---|---|---|---|---|
| 7,782,014 | B2 * | 8/2010 | Sivertsen | H02J 7/0022 320/118 |
| 8,181,045 | B2 | 5/2012 | Kim et al. | |
| 2003/0013474 | A1 * | 1/2003 | Pham | H04W 52/38 455/522 |
| 2004/0233929 | A1 * | 11/2004 | Hall | H04L 12/40045 370/464 |
| 2005/0265262 | A1 * | 12/2005 | Mizuguchi | H04L 12/10 370/258 |
| 2006/0218419 | A1 * | 9/2006 | Iwamura | G06F 1/3209 713/300 |

(Continued)

*Primary Examiner* — Volvick Derose
(74) *Attorney, Agent, or Firm* — Buchanan Ingersoll & Rooney PC

(57) ABSTRACT

A low frequency power management bus, a method of power management of a device, and a non-transitory computer readable program code configured to execute a power management process for a device are disclosed. The power management bus including a bus, and a plurality of power nodes connected to the bus, each of the plurality of power nodes including power management control logic, a power regulator, and a power policy, and wherein the plurality of power nodes are arranged in a topology with at least one node of the plurality of nodes being designated as a super power node, the super power node configured to be connected either directly or through another power node to each of the plurality of power nodes within the topology.

20 Claims, 9 Drawing Sheets

(56) References Cited

U.S. PATENT DOCUMENTS

| | | | |
|---|---|---|---|
| 2007/0239920 A1* | 10/2007 | Frid | G06F 13/4282 710/306 |
| 2007/0260901 A1* | 11/2007 | Berenbaum | G06F 1/3209 713/300 |
| 2008/0276110 A1* | 11/2008 | Indiani | G06F 1/3203 713/330 |
| 2009/0021955 A1* | 1/2009 | Kuang | H05B 33/0803 362/479 |
| 2009/0157933 A1* | 6/2009 | Conrad | G06F 1/3203 710/110 |
| 2010/0174927 A1* | 7/2010 | Kim | G06F 1/266 713/300 |
| 2010/0235003 A1* | 9/2010 | Maly | G06F 1/206 700/276 |
| 2011/0093739 A1* | 4/2011 | Bernon-Enjalbert | H04L 12/10 714/4.5 |
| 2011/0095608 A1* | 4/2011 | Jonsson | G01D 4/002 307/39 |
| 2011/0161455 A1* | 6/2011 | Johnson | H04L 41/0803 709/209 |
| 2011/0313586 A1* | 12/2011 | Popescu | H02J 13/0006 700/295 |
| 2012/0060044 A1* | 3/2012 | Jonsson | G01D 4/002 713/340 |
| 2012/0215874 A1* | 8/2012 | Sequeira | H04L 12/12 709/208 |
| 2013/0124763 A1* | 5/2013 | Kessler | G06F 13/4295 710/110 |
| 2013/0311804 A1* | 11/2013 | Garg | G06F 1/3203 713/320 |
| 2014/0101351 A1* | 4/2014 | Hooper | G06F 13/42 710/110 |
| 2014/0189376 A1 | 7/2014 | Rotem et al. | |
| 2014/0222226 A1* | 8/2014 | Bell | H02J 4/00 700/291 |
| 2015/0169026 A1* | 6/2015 | Bodas | G06F 1/3206 713/320 |
| 2016/0239060 A1* | 8/2016 | Koob | G06F 1/3237 |
| 2016/0242057 A1* | 8/2016 | Ripley | H04W 24/08 |
| 2016/0337878 A1* | 11/2016 | Frederiksen | H04W 24/02 |
| 2016/0352208 A1* | 12/2016 | Wien | H02M 1/0845 |
| 2017/0222829 A1* | 8/2017 | Kessler | H04L 12/43 |
| 2017/0346308 A1* | 11/2017 | Kain | B60L 58/13 |
| 2017/0353926 A1* | 12/2017 | Zhu | H04W 52/0216 |

* cited by examiner

LOW FREQUENCY POWER MANAGEMENT BUS

FIELD OF THE INVENTION

The present disclosure relates to a low frequency power management bus, and more particularly to a low frequency bus for power management across interconnected computing systems that provides flexibility and extendibility in low power design and integration during transitioning from a working power state to a low (or reduced) power state.

BACKGROUND OF THE INVENTION

Under conventional designs, in complex interconnected computing system, when the system attempts to transition into a low or an ultra-low power state, the system can experience inefficiency in the process and lack of flexibility in the design, which can create a barrier to integrate or introduce new device(s) because new software and modification of the old software stack are often required.

For example, in conventional designs, the main computer processing unit (CPU) scans through its list of known devices and initiate the power state transitioning for each individual device. This process is often inefficient because each device tends have its own specific power management requirement, and thus, the system must rely on extensive software stacks curtailing each technology. For example, Universal Serial Bus (USB) and Peripheral Component Interconnect Express (PCI-e), each has its own power management requirements. Other external devices over a common bus such as Inter-Integrated Circuit (I2C) or Serial Peripheral Interface bus (SPI) can also require different handling before transitioning to a power state.

In a Linux power management framework, for example, the process for setting the system into an ultra-low power state can involve the operating system traversing through the list of registered (known) devices in the system and performing, the following steps: (1) prepare and set devices in group A for low power; (2) perform power-down sequence for each device in the group; (3) remove power to all devices within the group (if it supports) for further power saving; (4) prepare and set devices in group B for low power; (5) perform power-down sequence for each device in the group; (6) remove power to all devices within the group (if it supports) for further power saving; (7) repeat for device group C, D, E, etc.; (8) main CPU powers down other sub-CPU in the system; (9) main CPU jumps to location outside of DRAM to put DRAM in self-refresh; and (10) main CPU put itself in ultra-low power state waiting for interrupt to wake up.

Although there are advance computing techniques such as multi-threading and software stacks that group similar devices to increase the efficiency in the process, these computing techniques still do not allow true autonomous behavior in devices (or group of devices) while transitioning into an ultra-low power state. Rather, the process still depends on the main CPU to tend to the progress. For system with small number of connected devices, the approach may be manageable at a reasonable performance. However, under complex system, for example, with thousands of connected devices, this process cannot be efficiently scaled because the dependency presents serious stress on the main CPU to meet the similar performance. In addition, similar response time to enter and exit the ultra-low power state is no longer achievable.

In addition, existing architectures do not provide simple method for integrating new device(s) into the system power domain. For example, if a new device is added to an existing system, additional software may be required to handle the power management logic and which must be created by someone with knowledge of the existing system. In addition, when new software is added to the system at such a low level, the process may require additional time and effort to audit the software to help ensure its quality.

SUMMARY OF THE INVENTION

It would be desirable to have a power management bus, which addresses the limitations described above by setting forth a solution that increases efficiency and flexibility in power management.

A low frequency power management bus is disclosed, the power management bus comprising: a bus; and a plurality of power nodes connected to the bus, each of the plurality of power nodes including power management control logic, a power regulator, and a power policy, and wherein the plurality of power nodes are arranged in a topology with at least one node of the plurality of nodes being designated as a super power node, the super power node configured to be connected either directly or through another power node to each of the plurality of power nodes within the topology.

A method of power management of a device is disclosed, the method comprising: connecting a plurality of power nodes connected to a bus, each of the plurality of power nodes including power management control logic, a power regulator, and a power policy; arranging the plurality of power nodes in a topology with at least one node of the plurality of nodes being designated as a super power node, the super power node configured to be connected either directly or through another power node to each of the plurality of power nodes within the topology; and transitioning the device to a power state via a message over the bus from the super power node, the message being intercepted by each of the plurality of power nodes and wherein each of the plurality of power nodes acts according to the power policy of the power node.

A non-transitory computer readable program code configured to execute a power management process for a device is disclosed, the process comprising: connecting a plurality of power nodes connected to a bus, each of the plurality of power nodes including power management control logic, a power regulator, and a power policy; arranging the plurality of power nodes in a topology with at least one node of the plurality of nodes being designated as a super power node, the super power node configured to be connected either directly or through another power node to each of the plurality of power nodes within the topology; and transitioning the device to a power state via a message over the bus from the super power node, the message being intercepted by each of the plurality of power nodes and wherein each of the plurality of power nodes acts according to the power policy of the power node.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
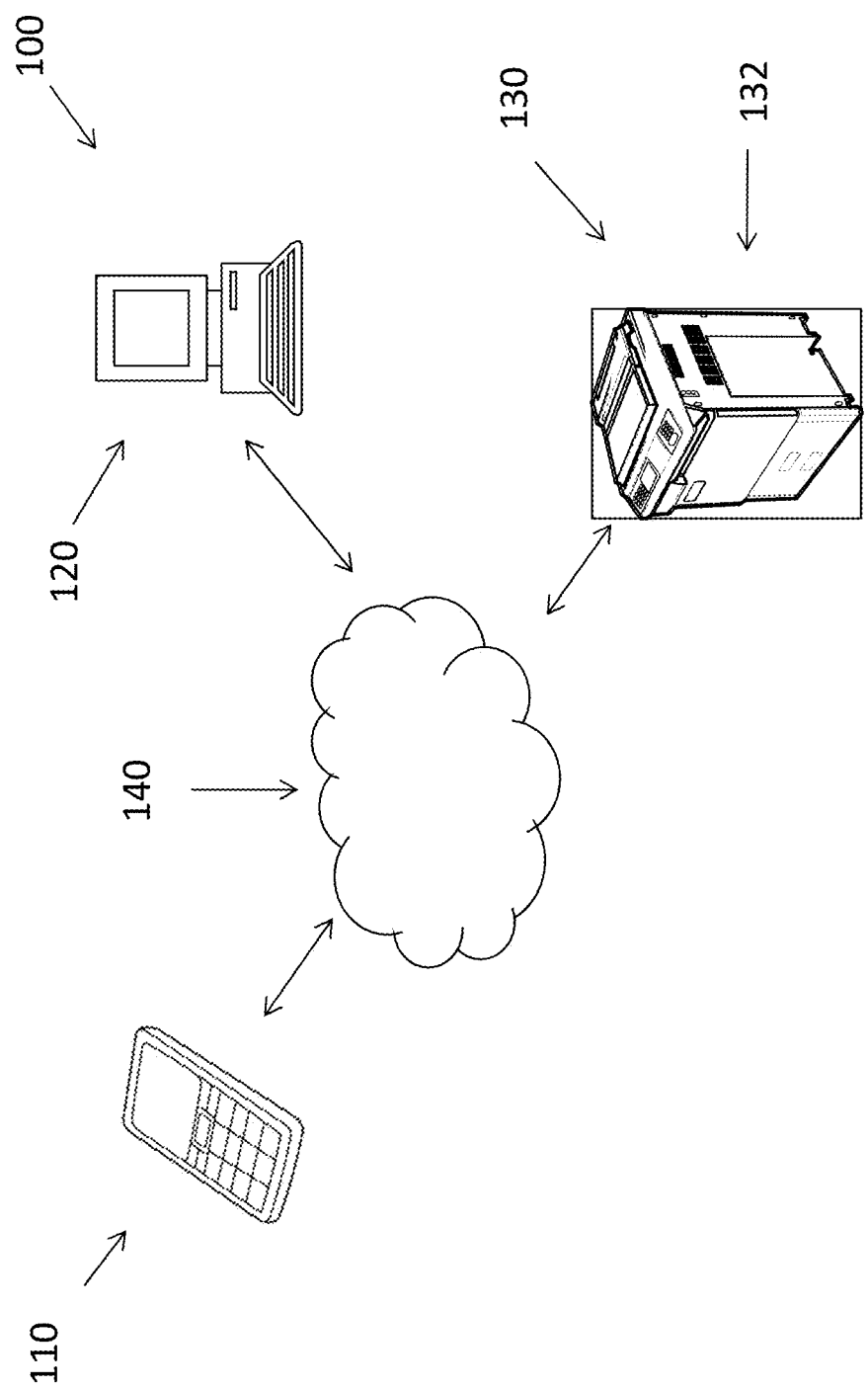
FIG. 1 is an illustration of an exemplary system having a plurality of devices in which a low frequency power management bus as disclosed can be implemented.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a power management bus is disclosed, which can include a plurality of power nodes, which is configured to allow devices to be grouped, organized, and managed in different topologies. In accordance with an exemplary embodiment, for example, one or more algorithms can be used to manage, for example, specific device groups having similar power policies. For example, in accordance with an exemplary embodiment, each of the one or more devices belonging to a same power node have two or more power states at least one of which is common to all of the one or more devices belonging to the same power node, and the power policy supports one or more of the common power states.

In addition, in accordance with an exemplary embodiment, each power node can have its own power policy property, which can be configurable via its software interface to fit the power consumption goals for the one or more devices connected to the power node. In accordance with an exemplary embodiment, an interface of each of the plurality of power nodes can be configured such that the interface can be easily extendable, such that new devices can be added to an existing system without extensive additional software development.

In accordance with an exemplary embodiment, for example, one power node can be connected to another power node, for example, in a parent-child dependency relationship on the system. In accordance with an exemplary embodiment, the connected devices on the bus can be structured to allow individual devices or group of devices to uniformly and independently participate in power state transitioning without attentive involvement by, for example, the main CPU.

FIG. 1 is an illustration of an exemplary system 100 having a plurality of devices 110, 120, 130, in which power management buses can be implemented in accordance with an exemplary embodiment. The system 100 can include at least one computing system, for example, one or more client devices 110, 120, and a host device 130, for example, in the form of a printer or a multifunction printer device (MFP) 132. In accordance with an exemplary embodiment, the one or more client devices 110, 120, and the host device 130 can be connected via a network connection 140.

In accordance with an exemplary embodiment, the one or more devices 110, 120, 130, which may be embodied, for example, by any known computing system or device, for example, a smart phone, a smart tablet, a personal computer, a camera, a router, a medical device or apparatus, a MFP (or printer), household appliances, such as a refrigerator, an oven, a dishwasher, a microwave, a television, sensors, lights, or an Internet of Thing (IOT) device, which has a low power mode (or energy saving state), which reduces battery consumption and/or power consumption from an electrical outlet, generator, or other device capable of generating electrical power.

In accordance with an exemplary embodiment, each of the devices and/or systems 110, 120, 130 can include a processor or central processing unit (CPU), and one or more memories for storing software programs and data (such as files to be printed). The processor or CPU carries out the instructions of a computer program, which operates and/or controls at least a portion of the functionality of the devices 110, 120, 130. Each of the devices and/or systems 110, 120, 130 can also include an operating system (OS), which manages the computer hardware and provides common services for efficient execution of various software programs.

In accordance with an exemplary embodiment, the at least one host device 130 can be a multi-function peripheral (MFP) or printer 132, which can be connected to the one or more client devices 110, 112 via the communications network 140. In accordance with an exemplary embodiment, the multi-function peripheral (MFP) 132 can include at least a copy function, an image reading function, a facsimile (fax) function, and a printer function, and forms an image on a sheet based on a print job (print instruction) received, from the one or more client devices 110, 120, for example, a client device 110, 120 in the form of a personal computer, a mobile device, or a personal digital assistant.

In accordance with an exemplary embodiment, the one or more client devices 110, 120 can be configured to submit print jobs to the at least one multifunction printers or printers 132 by transmitting data representing the documents to be printed and information describing the print job. The at least one multifunction printer or printer 132 can include a printer controller (or firmware), a memory section preferably in the form of a hard disk drive (HDD), an image processing section (or data dispatcher), a print engine, and an input/output (I/O) section. For example, in accordance with an exemplary embodiment, the printer 132 can be placed into a low power or reduced power consumption state during periods of inactivity, such that one or more of the peripherals, for example, functions related to fax, copy, scan and/or print, may be placed in a low power state.

In accordance with another exemplary embodiment, the host device 130 can be a medical device or a medical apparatus, which are used, for example, for diagnostic and/or therapeutic purposes. Examples of medical devices or medical apparatuses can include medical imaging devices, which can obtain, for example, radiological, angiographic, sonographic, and/or tomographic images. Alternatively, the host device 130 can be, for example, a back-end database, or enterprise database system, which can be accessed by the one or more users indirectly through an external application, for example, through the client device 110, 120.

In accordance with an exemplary embodiment, the one or more clients 110, 120, and the at least one host device 130, for example, in the form of a printer 132, can be connected via the Internet or communication network (or network) 140. The communication network 140 may include, for example, a conventional type network, wired or wireless, and may have any number of configurations, such as a star configuration, token ring configuration, or other known configurations. The communication network 140 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, other generations), and/or any other interconnected data path across which multiple computing nodes may communicate.

Figure 2:
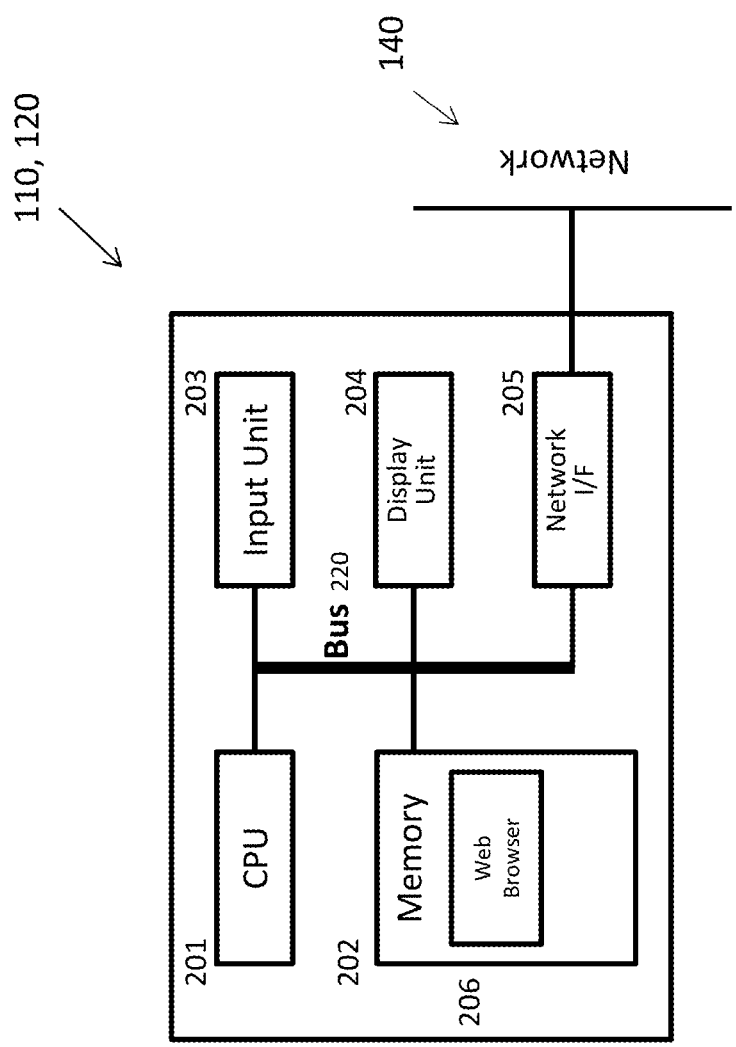
FIG. 2 is an illustration of a client device in which a low frequency power management bus in accordance with an exemplary embodiment can be implemented.

FIG. 2 is an illustration of a client device 120, for example, a computer, in which a low frequency power management bus in accordance with an exemplary embodiment can be implemented. As shown in FIG. 2, the exemplary client device 120 can include a processor or central processing unit (CPU) 201, and one or more memories 202 for storing software programs and data (such as files to be printed), and a printer driver. The printer driver of the client device 120 is preferably a software application that converts data to be printed into a form specific for the printer 132. The processor or CPU 201 carries out the instructions of a computer program, which operates and/or controls at least a portion of the functionality of the client device 120. The client device 120 can also include an input unit 203, a display unit or graphical user interface (GUI) 204, and a network interface (I/F) 205, which is connected to a communication network (or network) 140. In accordance with an exemplary embodiment, a data bus 220 can connect the various components 201, 202, 203, 204, 205 within the client device 120. In accordance with an exemplary embodiment, the data bus 220 can be a high frequency data bus for exchanging data between the various components. In addition, the client device 120 can have a separate low frequency power management bus 460 (FIG. 4) configured to manage power to the various components.

In accordance with an exemplary embodiment, the client device 120 can include a display unit or graphical user interface (GUI) 204, which can access the web browser 206 in the memory 202 of the client device 120. The web browser 206 is configured to provides access to the web portal (or management program) 202. The client device 120 also includes an operating system (OS), which manages the computer hardware and provides common services for efficient execution of various software programs. The software programs can include, for example, application software and printer driver software. For example, in accordance with an exemplary embodiment, the client device 120 can include printer driver software, which controls a multifunction printer or printer 132, for example connected with the client device 120 in which the printer driver software is installed via the communication network 140. In certain embodiments, the printer driver software can produce a print job and/or document based on an image and/or document data. In addition, the printer driver software can control transmission of the print job from the client device 120 to the printer or printing device 132.

Figure 3:
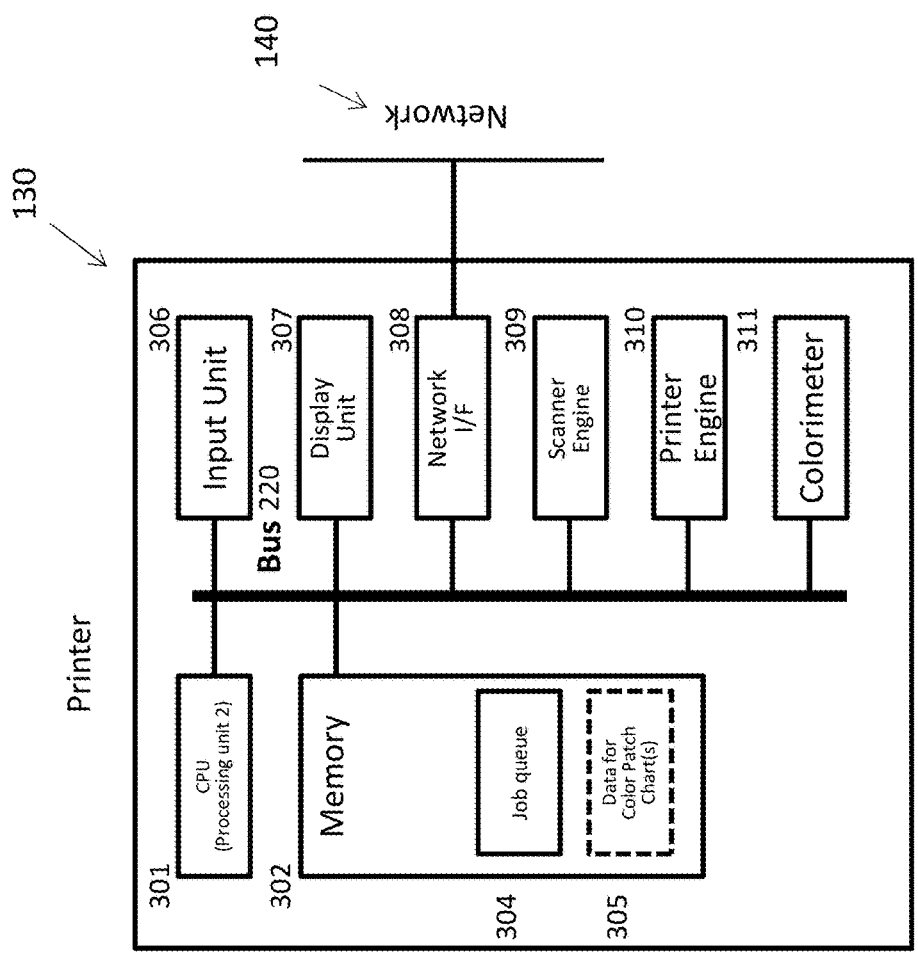
FIG. 3 is an illustration of a printer or printing device in which a low frequency power management bus in accordance with an exemplary embodiment can be implemented.

FIG. 3 is an illustration of a host device 130 in the form of a printer or a printing device 132, which can also be referred to as an image forming apparatus, in which a low frequency power management bus in accordance with an exemplary embodiment can be implemented. As shown in FIG. 3, the printer 132 can include a network interface (I/F) 308, which is connected to the communication network (or network) 140, a processor or central processing unit (CPU) 301, and one or more memories 302 for storing software programs and data (such as files to be printed). For example, the software programs can include a printer controller and a tray table. The processor or CPU 301 carries out the instructions of a computer program, which operates and/or controls at least a portion of the functionality of the printer 132. In accordance with an exemplary embodiment, the one or more memories 302 can include a job queue 304 and data for color patch chart(s) 305. The printer 132 can also include an input unit 306, a display unit or graphical user interface (GUI) 307, a network interface (I/F) 308, a scanner engine (or scanner) 309, a printer engine 310, and a colorimeter 311.

Figure 4:
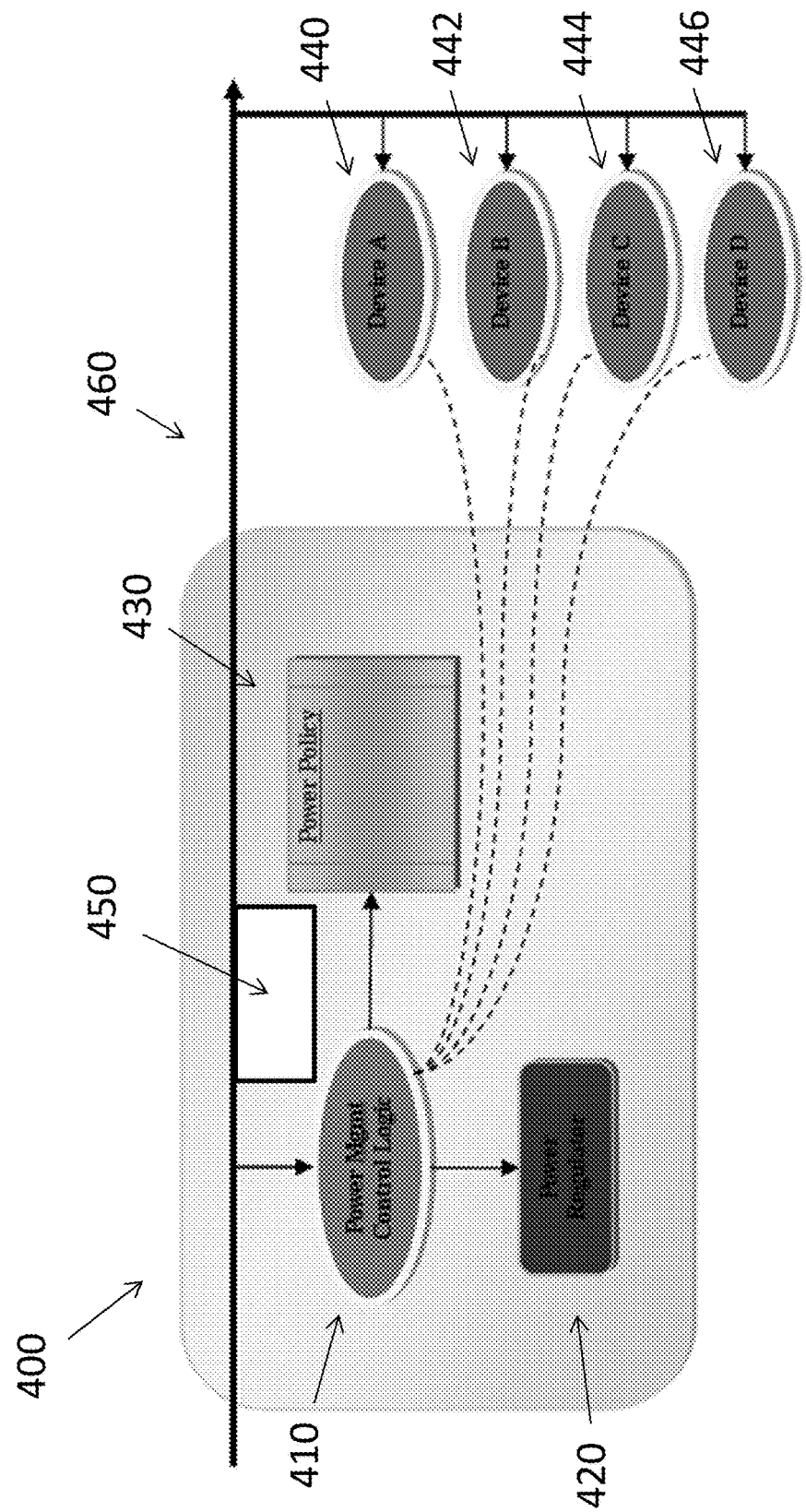
FIG. 4 is an illustration of a power node of a low frequency power management bus in accordance with an exemplary embodiment.

In accordance with an exemplary embodiment, a data bus 220 connects the various components 301, 302, 304, 305, 306, 307, 308, 309, 310, 311 within the printer 130. In accordance with an exemplary embodiment, the data bus 220 is a high frequency for exchanging data between the various components. In addition, the host device 130 can have a separate low frequency power management bus 460 as shown in FIG. 4 configured to manage power to the various components. The printer 132 also includes an operating system (OS), which manages the computer hardware and provides common services for efficient execution of various software programs. In accordance with an exemplary embodiment, it can be within the scope of the disclosure for the printer 132 to be a copier.

For example, in accordance with an exemplary embodiment, an image processing section within the printer 132 can carry out various image processing under the control of a print controller or CPU 301, and sends the processed print image data to the print engine 310. The image processing section can also include a scanner section (scanner 309) for optically reading a document. The scanner section receives the image from the scanner 309 and converts the image into a digital image. The print engine 310 forms an image on a print media (or recording sheet) based on the image data sent from the image processing section. The central processing unit (CPU) (or processor) 301 and the memory 302 can include a program for RIP processing (Raster Image Processing), which is a process for converting print data included in a print job into Raster Image data to be used in the printer or print engine 310. The CPU 301 can include a printer controller configured to process the data and job information received from the one or more client devices 110, 120, for example, received via the network connection unit and/or input/output section (I/O section) 308.

The CPU 301 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client devices 110, 120 to generate a print image.

In accordance with an exemplary embodiment, the network I/F 308 performs data transfer with the one or more client devices 110, 120. The printer controller can be programmed to process data and control various other components of the multi-function peripheral to carry out the various methods described herein. In accordance with an exemplary embodiment, the operation of printer section commences when the printer section receives a page description from the one or more client devices 110, 120 via the network I/F 308 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 132 consistent with exemplary embodiments of the disclosure include, but are not limited to, a multi-function peripheral (MFP), a laser beam printer (LBP), an LED printer, a multi-function laser beam printer including copy function.

FIG. 4 is an illustration of a power node 400 of a low frequency power management bus 460 in accordance with an exemplary embodiment. As shown in FIG. 4, the low frequency power management bus 460 includes at least one power node 400 having power management control logic 410, which can be a software program (or portion of a software program) configured to control operation of the at least one power node 400, a power regulator 420 configured to regulate power, for example to one or more devices 440, 442, 444, 446, and a power policy 430 for the power node 400. In accordance with an exemplary embodiment, each of the power nodes 400 can be either of hardware or of software. For example, in accordance with an exemplary embodiment, the power node 400 can be a hardware or software extension configured to support hardware within a system, for example, on a chip (SOC) or external devices, and/or a software application or implementation.

In accordance with an exemplary embodiment, the low frequency power management bus 460 can be connected to the one or more devices 440, 442, 444, 446, and wherein each of the one or more devices 440, 442, 444, 446 is configured to consume power. In accordance with an exemplary embodiment, the one or more devices 440, 442, 444, 446 can include, for example, a chipset, a platform control hub, a memory controller, graphics logic, and/or a memory. For example, the chipset can be a set of electronic components in an integrated circuit that manages data flow between a processor, memory, and peripherals. In accordance with an exemplary embodiment, the one or more devices 440, 442, 444, 446 can also include integrated sensors, integrated circuit modules, for example, on an electrical circuit board, and/or a distributed network of circuit components.

In accordance with an exemplary embodiment, the power management control logic 410 is preferably a software program that controls the operations of the power node 400. For example, the power management control logic 410 can control the supply of power to the one or more devices (or power management systems) 440, 442, 444, 446 based on the power policy 430 for the node 400. In accordance with an exemplary embodiment, the power policy 430 for each of the devices 440, 442, 444, 446 can include, for example, a low power or an ultra-low power state (for example, a reduced power state), and/or, for example, a state in which all power is removed from the device 440, 442, 444, 446. In addition, the power regulator 420 can be configured to regulate the amount of power being supplied to each of the one or more devices 440, 442, 444, 446 based on the power policy 430 of the node 400. In accordance with an exemplary embodiment, for example, the power node 400 can be flexible and extendable to support hardware within a system, for example, on a chip (SOC) or external devices, and/or a software application or implementation.

Figure 5A:
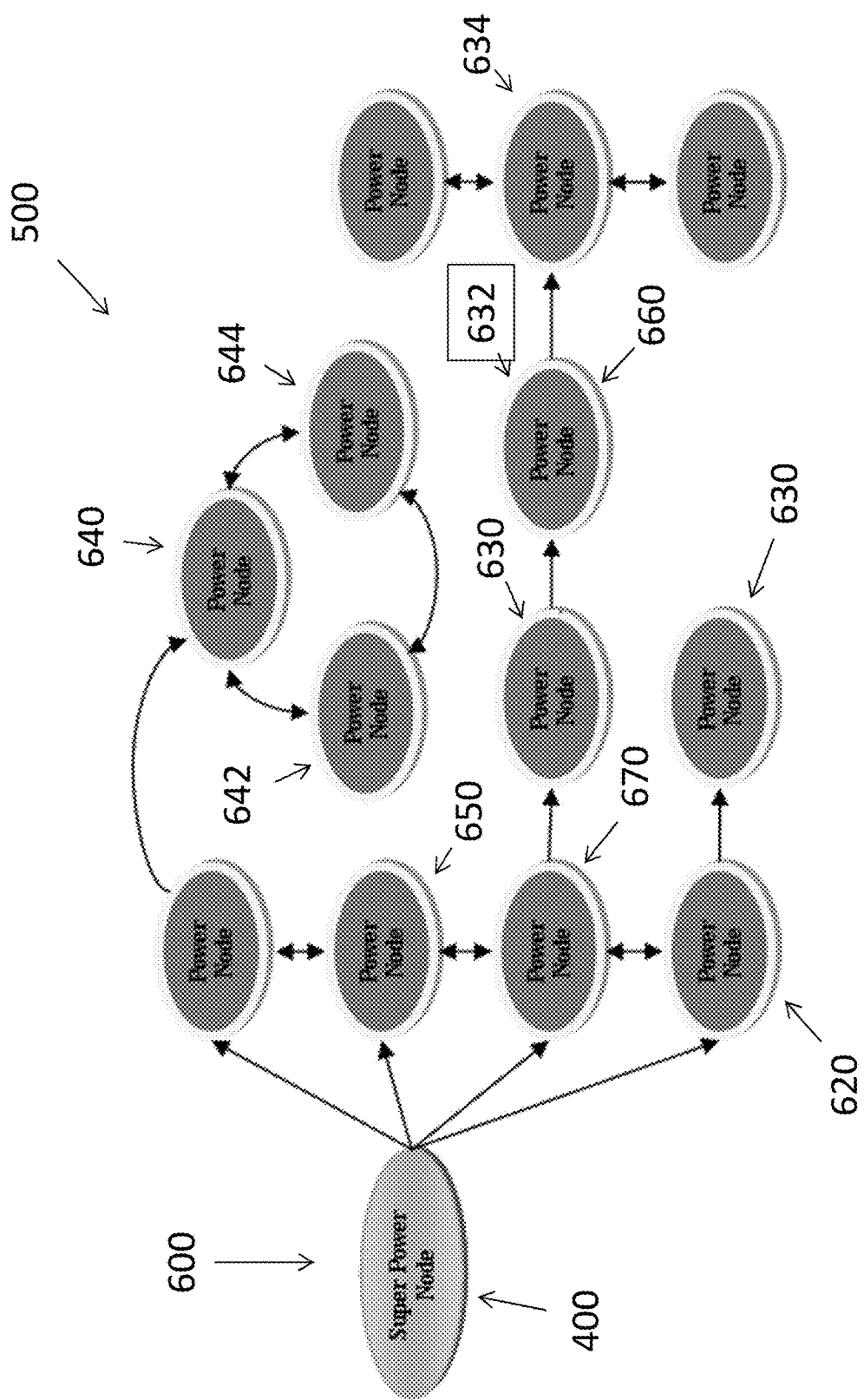
FIG. 5A is an illustration of a power node system in accordance with an exemplary embodiment.

FIG. 5A is an illustration of a power node system 500 for a power management bus 460 in accordance with an exemplary embodiment. In accordance with an exemplary embodiment, the power node system 500 includes a plurality of power nodes 400. In accordance with an exemplary embodiment, at least one of the plurality of nodes 400 is designated as a super power node 600 and a remainder of the plurality of power nodes 400 can be either directly connected to the at least one super power node 600 (for example, power node 620), or connected to another power node 400, for example, power node 630, which is connected to power node 620, which is connected the super power node 600. In accordance with an exemplary embodiment, the super power node 600 can typically be a master CPU, a slave CPU connected with the master CPU via the data bus 220 and connected with other power nodes via the power management bus 460, or hardware logic in lieu of the CPU.

In accordance with an exemplary embodiment, the interconnectivity between each of the power nodes 400 can be determined based on their physical connections to the low frequency power management bus 460. As shown in FIG. 5A, for example, the power node system 500 can include two or more power nodes 400, for example, power nodes 620, 630, which form or make up the system 500, and which are controlled by the super power node 600.

Figure 5B:
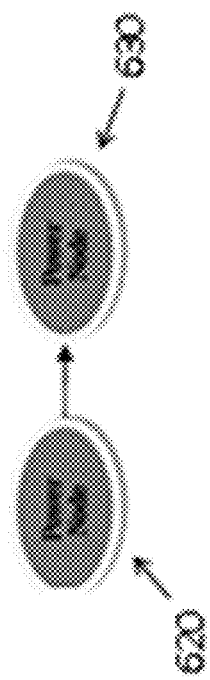
FIG. 5B is an illustration of a parent-child relationship as shown in FIG. 5A in accordance with an exemplary embodiment.

In accordance with an exemplary embodiment, for example, as shown in FIG. 5B, each power node 400 can be designed to have a parent-child relationship with another power node 400, so that the parent power node 620 will only enter a designated power state once the child power node 630 is successfully transitioned to a corresponding power state. For example, in accordance with an exemplary embodiment, if the child power node 630 is transitioned to a power state for the one or more devices 440, 442, 444, 446 (FIG. 4) associated with the power node 620, the parent power node 620 can also be placed in a corresponding power state. For example, if the power state for the child power node 630 is a low power state or an ultra-low power state, the parent power node 620 can be placed in a corresponding power state, for example, a low power state or an ultra-low power state. In accordance with an exemplary embodiment, each of the power nodes 400 is preferably connected to a power node 400, which controls one or more devices having a similar power policy.

Figure 5C:
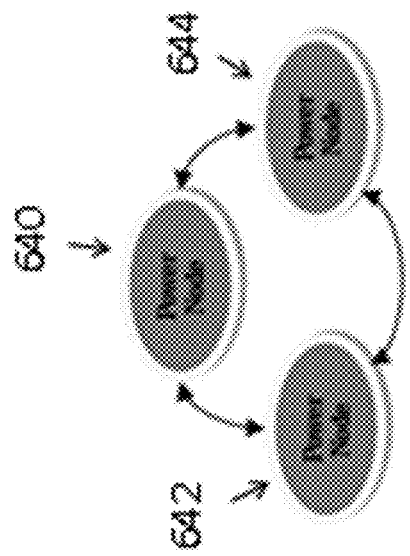
FIG. 5C is an illustration of three or more power nodes as shown in FIG. 5A, which are connected to one another, such that the corresponding power state can be dependent on a corresponding power state of two or more power nodes in accordance with an exemplary embodiment.
Figure 5E:
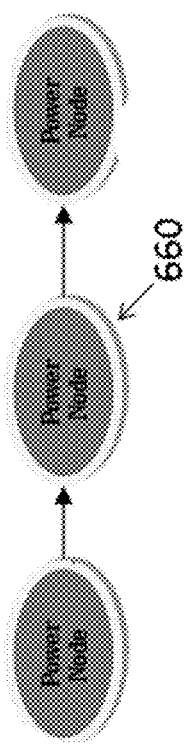
FIG. 5E is an illustration of a power node as shown in FIG. 5A arranged in a vertical relationship with one or more power nodes in accordance with an exemplary embodiment.
Figure 5D:
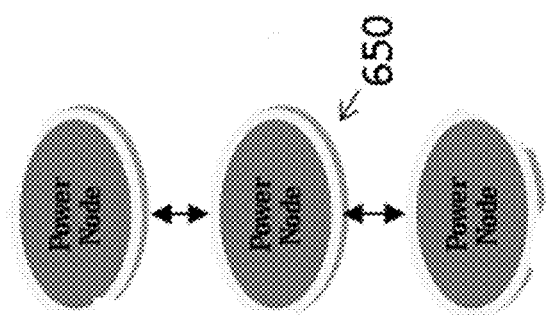
FIG. 5D is an illustration of a power node as shown in FIG. 5A arranged in a horizontal relationship with one or more power nodes in accordance with an exemplary embodiment.
Figure 5F:
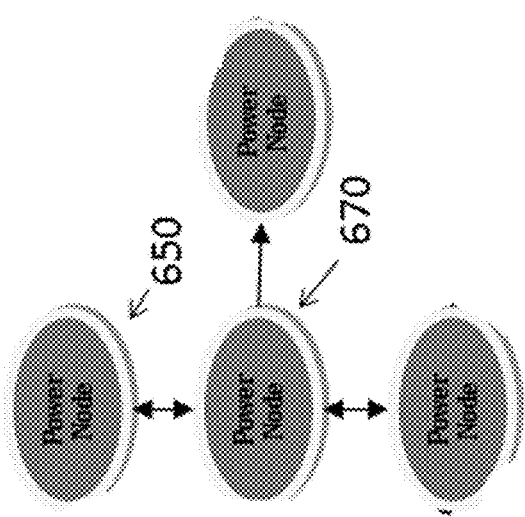
FIG. 5F is an illustration of a power node as shown in FIG. 5A arranged in a vertical and a horizontal relationship with one or more power nodes in accordance with an exemplary embodiment.

In accordance with an exemplary embodiment, as shown in FIG. 5C, three or more power nodes 640, 642, 644, can be connected to one another, such that the corresponding power state can be dependent on a corresponding power state of two or more power nodes 640, 642, 644, which are directly connected to each other in a circular arrangement. In addition, a power node 610 of the plurality of power nodes 650, 660, 670 can have a vertical relationship (power node 650), a horizontal relationship (power node 660), and/or a horizontal and a vertical relationship (power node 670) as shown in FIGS. 5D-5F, respectively.

In accordance with an exemplary embodiment, the super power node 600 can be configured to transition to a power state (for example, an ultra-low power state) via a message conveyed over the low frequency power management bus 460, and each of the power nodes 400 would intercept and act according to their own power policy. Once each of the power nodes are successfully transitioned, the super power node 600 will then also transition to targeted state. In accordance with an exemplary embodiment, other neighbor super node(s) 600 (FIG. 6) can also participate in the broadcasted event depending on the power policy of the neighboring super nodes 600. For example, in accordance with an exemplary embodiment, neighboring super nodes 600 may have different power policies such that a neighboring super node 600 may not broadcast the message or event to corresponding nodes 400 of the neighboring super node 600. For example, in accordance with an exemplary embodiment, for example, a power node 400 within one of the two or more super power nodes 600 is not visible to another of the two or more super power nodes 600.

In accordance with an exemplary embodiment, each power node 400 can have its own power policy 430 (FIG. 4), which further allows customization over the default behavior for itself 610 and its children 620. For example, in accordance with an exemplary embodiment, a power node 610 can transition to a low power state to further save power, while leaving a power rail owned by the power node in an "on state" so that wake-up interrupt is possible (for example, for use with power buttons, touch sensors, etc.).

In accordance with an exemplary embodiment, at start, the super power node 600 scans through the low frequency power management bus 460 and performs a handshake per each discovered power node 400. Each power node 400 can be assigned a unique address that can be used in later messages for direct communication to the power node 400. In accordance with an exemplary embodiment, the super power node 600 can be configured to assign the unique address to each of the power nodes 400 within the system 500. In accordance with an exemplary embodiment, a link can be established between two power nodes 620, 630 to influent each other's power policy. For example, if power node A 620 has direct memory access (DMA) that requires dynamic random-access memory (DRAM), a wake-up event for power node A 620 would also cause a wake up for power node X that owns DRAM.

In accordance with an exemplary embodiment, the low frequency power management bus 460 can be designed such that a secured connection can be established between power nodes 400. For example, the secured connection can be configured to uphold a chain of trust in a system that requires, for example, high security between connected devices 440, 442, 444, 446.

In accordance with an exemplary embodiment, the low frequency power management bus 460 can be a low frequency bus for power management. For example, both internal hardware blocks within a system on a chip (SOC) and other external devices can be connect to and participate in system-wide power events. In accordance with an exemplary embodiment, for example, the connected system can create a pathway for such owner of a system to reach to every device via broadcast message. In accordance with an exemplary embodiment, for example, the low frequency power management bus 460 can be configured with one or more of the following:

(1) each node 400 is connected to one more devices 440, 442, 444, 446 that have similar power policy 430;

(2) each child node 400 (630) may have its own private children node 400 (632);

(3) each node 400 (for example, 630) is capable of deciding the power state of its own and propagating the message through its children node(s) 400 (for example, 632, 634) due to either request from a parent node 632 or an event generate internally within the child node 634;

(4) each node 400 has control of its power regulator 420; and (5) each node 400 can be accessed via a software interface 450 on the node 400, which can allow the logic of the node 400 to be extended to another device or power management system, for example, a power management system composed of software, and/or of software only.

In accordance with an exemplary embodiment, the low frequency power management bus 460 can have, for example, a frequency of 10 KHz to 7 MHz, which design can be efficient in a low power state, for example, an energy saving state. In accordance with an exemplary embodiment, the power consumption in the frequency range of 10 KHz to 7 MHz from the hardware can be negligible, such that the low frequency bus 460 as disclosed herein can be suitable for low power application. However, the frequency range can be configured by an implementer within any desired range for bus operation. For example, faster frequency may require slightly more hardware design and consideration to maintain the integrity of the bus 460.

In accordance with an exemplary embodiment, for example, a low power state can be a state in which the device 440, 442, 444, 446 is idle, that is, not being accessed or a non-working state, and is capable of entering the low power state, for example, a reduced power consumption state from the working state. In accordance with an exemplary embodiment, each of the power nodes 400 as shown, for example, in FIG. 5A, including the super power node 600 are connected to the low frequency power management bus 460. In addition, each power event message is broadcast over the low frequency power management bus 460.

In accordance with an exemplary embodiment, upon starting of a client device 110, 120, or host device 130, each of the one or more super power nodes 600 goes through a discovery process to establish a topology of the system 500 of power nodes 610. If more than one super power node 600 is connected to the low frequency power management bus 460, a sequence of negotiation can occur to establish the handshake per each connection. In accordance with an exemplary embodiment, the handshake can be an automated process of negotiation that dynamically sets parameters of a communication channel established between the nodes 400 before normal communications begins, for example, transfer of data or messages over the nodes 400. In addition, an auto-discovery stage can be used, which allows neighboring power nodes 400 (for example, 620, 630) to discover and perform a handshake with one another. In accordance with an exemplary embodiment, for additional security, an encryption key can be used on top of the disclosed protocol to help ensure the chain of trust between power nodes 400 in the system 500 is maintained.

In accordance with an exemplary embodiment, in the event of a power state transitioning message is being broadcast over the low frequency power management bus 460, each power node 400 can intercept and start transitioning its devices 440, 442, 444, 446 to requested power state. In accordance with an exemplary embodiment, the hardware and software components in the system 500 can be uniformly and quickly transitioned to a desired power state with less coordination required from, for example, the main CPU. Thus, in accordance with an exemplary embodiment, advantageously, the system 500 can be more responsive due to reduction of lag time in between power states of the devices 440, 442, 444, 446.

Figure 6:
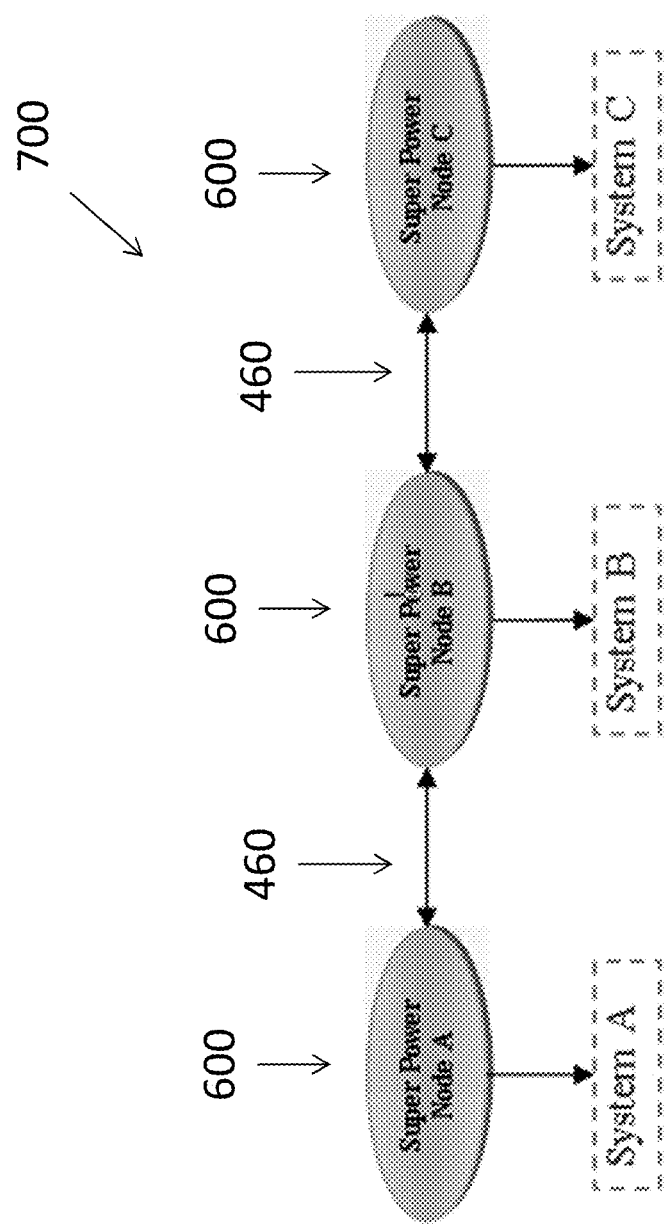
FIG. 6 is an illustration of connectivity between a plurality of super power nodes in accordance with an exemplary embodiment.

FIG. 6 is an illustration of connectivity 700 between two or more super power nodes 600 in accordance with an exemplary embodiment. As shown in FIG. 6, the two or more super power nodes 600 can be connected to each other via the same low frequency power management bus 460. For example, in accordance with an exemplary embodiment, each of the super nodes 600 can both drive and participate in power management events.

In accordance with an exemplary embodiment, a non-transitory computer readable program code configured to execute a power management process for a device is disclosed, the process comprising: connecting a plurality of power nodes connected to a bus, each of the plurality of power nodes including power management control logic, a power regulator, and a power policy; arranging the plurality of power nodes in a topology with at least one node of the plurality of nodes being designated as a super power node, the super power node configured to be connected either directly or through another power node to each of the plurality of power nodes within the topology; and transitioning the device to a power state via a message over the bus from the super power node, the message being intercepted by each of the plurality of power nodes and wherein each of the plurality of power nodes acts according to the power policy of the power node.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A low frequency power management bus, the low frequency power management bus comprising:
a bus;
a plurality of power nodes and at least one super power node connected to the bus, each of the plurality of power nodes and the at least one super node including power management control logic, a power regulator, and a power policy, and wherein the plurality of power nodes and the at least one super node are configured to be arranged in a plurality of configurable topologies, the super power node being configured to be connected either directly or through another power node to each of the plurality of power nodes within each of the plurality of configurable topologies; and
wherein the plurality of power nodes include three or more power nodes, the three or more power nodes being configurable to be connected to one another and transformable from a circular arrangement, a vertical relationship, a horizontal relationship, and/or a horizontal and vertical relationship to another of a circular arrangement, a vertical relationship, a horizontal relationship, and/or a horizontal and vertical relationship.

2. The power management bus according to claim 1, wherein the super power node is configured to transition a device to a power state via a message over the bus, the message being intercepted by each of the plurality of power nodes and wherein each of the plurality of power nodes acts according to the power policy of the corresponding power node.

3. The power management bus according to claim 1, wherein each of the plurality of power nodes is configured to be connected to one or more devices having a similar power policy.

4. The power management bus according to claim 1, wherein each of the plurality of power nodes is accessed through a software interface.

5. The power management bus according to claim 1, wherein the at least one super power node is configured to perform a discovery process to discover a topology of the plurality of power nodes.

6. The power management bus according to claim 1, wherein the plurality of power nodes includes two or more super power nodes, and wherein the two or more super power nodes are configured to establish a sequence of negotiations for establishing a handshake between each of the plurality of power nodes.

7. The power management bus according to claim 1, wherein the bus is a low frequency bus having a frequency between 10 KHz to 7 MHz and configured to be efficient in a low power state, the low power state being a state in which a device is not in a working state.

8. The power management bus according to claim 1, wherein a power state of each of the three or more power nodes is dependent on a corresponding power state of another of the three or more power nodes.

9. A method of power management of a device, the method comprising:
connecting a plurality of power nodes and at least one super power node to a bus, each of the plurality of power nodes and the at least one super power node including power management control logic, a power regulator, and a power policy;
arranging the plurality of power nodes and the at least one super power node in a plurality of configurable topologies, the super power node being configured to be connected either directly or through another power node to each of the plurality of power nodes within each of the plurality of configurable topologies, and wherein the plurality of power nodes include three or more power nodes, the three or more power nodes being configurable to be connected to one another and transformable from a circular arrangement, a vertical relationship, a horizontal relationship, and/or a horizontal and vertical relationship to another of a circular arrangement, a vertical relationship, a horizontal relationship, and/or a horizontal and vertical relationship; and
transitioning the device to a power state via a message over the bus from the super power node, the message being intercepted by each of the plurality of power nodes and wherein each of the plurality of power nodes acts according to the power policy of the power node.

10. The method according to claim 9, comprising:
connecting each of the plurality of power nodes to one or more devices having a power policy, wherein each of the one or more devices belonging to a same power node have two or more power states at least one of which is common to all of the one or more devices belonging to the same power node, and the power policy supports one or more of the common power states.

11. The method according to claim 9, comprising:
accessing each of the plurality of power nodes through a software interface.

12. The method according to claim 9, comprising:
performing a discovery process by the super power node to discover a topology of each of the plurality of power nodes under the super power node.

13. The method according to claim 9, wherein the plurality of power nodes includes two or more super power nodes, and wherein the two or more super power nodes are configured to establish a sequence of negotiations for establishing a handshake between each of the plurality of power nodes, and wherein a power node within one of the two or more super power nodes is not visible to another of the two or more super power nodes.

14. The method according to claim 9, comprising:
a power state of each of the three or more power nodes being dependent on a corresponding power state of another of the three or more power nodes.

15. A non-transitory computer readable medium configured to execute a power management process for a device, the process comprising:
connecting a plurality of power nodes and at least one super node to a bus, each of the plurality of power nodes and the at least one super node including power management control logic, a power regulator, and a power policy;
arranging the plurality of power nodes and the at least one super power node in a plurality of configurable topologies, the super power node being configured to be connected either directly or through another power node to each of the plurality of power nodes within each of the plurality of configurable topologies, and wherein the plurality of power nodes include three or more power nodes, the three or more power nodes being configurable to be connected to one another and transformable from a circular arrangement, a vertical relationship, a horizontal relationship, and/or a horizontal and vertical relationship to another of a circular arrangement, a vertical relationship, a horizontal relationship, and/or a horizontal and vertical relationship; and
transitioning the device to a power state via a message over the bus from the super power node, the message being intercepted by each of the plurality of power nodes and wherein each of the plurality of power nodes acts according to the power policy of the power node.

16. The computer readable medium according to claim 15, comprising:
connecting each of the plurality of power nodes to one or more devices having a power policy, wherein each of the one or more devices belonging to a same power node have two or more power states at least one of which is common to all of the one or more devices belonging to the same power node, and the power policy supports one or more of the common power states.

17. The computer readable medium according to claim 15, comprising:
accessing each of the plurality of power nodes through a software interface.

18. The computer readable medium according to claim 15, comprising:
performing a discovery process by the super power node to discover a topology of each of the plurality of power nodes under the super power node.

19. The computer readable medium according to claim 15, wherein the plurality of power nodes includes two or more super power nodes, and wherein the two or more super power nodes are configured to establish a sequence of negotiations for establishing a handshake between each of the plurality of power nodes, and wherein a power node within one of the two or more super power nodes is not visible to another of the two or more super power nodes.

20. The computer readable medium according to claim 15, comprising:
a power state of each of the three or more power nodes being dependent on a corresponding power state of another of the three or more power nodes.

* * * * *